(12) United States Patent  
Griffin et al.

(10) Patent No.: US 8,696,048 B2
(45) Date of Patent: Apr. 15, 2014

(54) FIBER-REINFORCED FLOOR SYSTEM

(75) Inventors: Patrick M. Griffin, Lafayette, IN (US); David P. Kunkel, Lebanon, IN (US)

(73) Assignee: Wabash National, L.P., Lafayette, IN (US)

( * ) Notice: Subject to any disclaimer, the term of this patent is extended or adjusted under 35 U.S.C. 154(b) by 0 days.

(21) Appl. No.: 13/331,419

(22) Filed: Dec. 20, 2011

(65) Prior Publication Data
US 2012/0169087 A1    Jul. 5, 2012

Related U.S. Application Data

(60) Provisional application No. 61/430,017, filed on Jan. 5, 2011.

(51) Int. Cl.
*B62D 21/14* (2006.01)

(52) U.S. Cl.
USPC .................................. 296/184.1; 296/193.07

(58) Field of Classification Search
USPC ............... 296/184.1, 193.07, 187.08, 193.02, 296/204, 37.14, 151; 52/177, 650.3, 508; 428/118, 117, 79; 105/422, 375
See application file for complete search history.

(56) References Cited

U.S. PATENT DOCUMENTS

| | | | | |
|---|---|---|---|---|
| 4,631,891 A | * | 12/1986 | Donavich | 52/588.1 |
| 6,843,525 B2 | * | 1/2005 | Preisler | 296/193.07 |
| 7,517,005 B2 | * | 4/2009 | Kuriakose | 296/184.1 |
| 7,575,264 B1 | * | 8/2009 | Solomon | 296/26.02 |

* cited by examiner

*Primary Examiner* — Joseph Pape
*Assistant Examiner* — Dana Ivey

(57) ABSTRACT

A floor system configured for use with a storage container such as a trailer. The floor system includes an upper floor section including a plurality of upper floor boards made of glass fiber reinforced polymer, and a lower floor section including a plurality of lower floor boards made of glass fiber reinforced polymer. The upper floor boards are configured to extend along a length of the trailer and the lower floor boards are configured to extend across the width of the trailer.

16 Claims, 11 Drawing Sheets

FIBER-REINFORCED FLOOR SYSTEM

This application claims priority under 35 U.S.C. §119(e) to U.S. Provisional Patent Application Ser. No. 61/430,017 entitled FIBER-REINFORCED FLOOR SYSTEM and filed Jan. 5, 2011, the entirety of which is hereby incorporated by reference herein.

FIELD OF THE INVENTION

The present invention relates generally to a floor system for a storage container, such as a truck trailer, for example.

BACKGROUND

The floor system of many storage containers, such as large truck trailers, for example, typically includes a floor material, or deck, which may be formed of aluminum or wood planks. The floor material forms the inside, bottom surface of the storage container and typically rests on and is supported by metal (typically steel or aluminum) cross members of the floor system which extend laterally across a width of the storage container. Each end of the cross members is connected to a portion of the respective bottom rail of a side wall of the storage container. A plurality of the cross members are provided at regularly spaced locations along the bottom rail. Typically, each cross member is formed from a conventional I-beam. Refrigerated trailers may also include thermal risers and/or spacer materials, such as urethane foam, between the floor material and the cross members. A subpan may also be provided between the cross members and the spacer material.

Illustratively, the floor material may be made from wood floor boards, laminate wood floor boards, and/or a fiber reinforced composite wood floor boards, for example. Such composite wood floor boards typically include laminated wood which is underlaid with a thin layer of fiber reinforced plastic. Each floor board is typically secured to the cross members by screws extending through the thicknesses of the board and the upper flanges of the cross members.

SUMMARY

The present invention may comprise one or more of the features recited in the attached claims, and/or one or more of the following features and combinations thereof.

According to one aspect of the present disclosure, a floor system configured for use with a storage container such as a trailer includes an upper floor section made of a fiber reinforced polymer, and a lower floor section made of a fiber reinforced polymer. The upper floor section is heat-welded to the lower floor section. Further, substantially all of a bottom surface of the lower floor section is open to the surrounding environment.

In one illustrative embodiment, the fiber reinforced plastic may include glass fibers.

In another illustrative embodiment, the upper floor section may include a plurality of upper floor boards coupled to each other and the lower floor section may include a plurality of lower floor boards coupled to each other. Illustratively, the upper floor boards may cooperate with each other to define a generally continuous upper floor surface and the lower floor boards may cooperate with each other to define a generally continuous lower floor surface. Alternatively, the lower floor boards may be spaced-apart from each other. Further illustratively, a cross-sectional shape of each of the upper floor boards may generally be the same as a cross-sectional shape of each of the lower floor boards. In particular, the cross-sectional shape of each of the upper and lower floor boards may define a plurality of generally U-shaped channels. A width of each of the upper and lower boards may be in the range of approximately 12 and 23 inches while a height of each of the upper and lower boards may be in the range of approximately 1.0 and 2.5 inches.

In still another illustrative embodiment, a longitudinal axis of the upper floor boards may be perpendicular to a longitudinal axis of the lower floor boards. Illustratively, the longitudinal axis of the upper floor boards may be configured to be parallel to a longitudinal axis of the storage container. Alternatively, the longitudinal axis of the upper floor boards may be configured to be perpendicular to the longitudinal axis of the storage container.

In yet another illustrative embodiment, the floor system may further include an attachment plate coupled to at least one of the upper floor section and the lower floor section and configured to be coupled to a sidewall of the trailer.

In still another illustrative embodiment, the upper and the lower floor sections may be corrugated.

In yet another illustrative embodiment, the floor system may further include a spacer between the upper floor section and the lower floor section. Illustratively, the spacer may be made from one or more of a foam material, a plastic material, a wood material.

According to another aspect of the present disclosure, a floor system configured for use with a storage container such as a trailer includes an upper floor section made of a plurality of glass fiber reinforced polymer boards, and a lower floor section made of a plurality of glass fiber reinforced polymer boards. A cross-sectional shape of each of the boards of the upper floor section is generally the same as a cross-sectional shape of each of the boards of the lower floor section.

In one illustrative embodiment, the upper floor section may be heat-welded to the lower floor section.

In another illustrative embodiment, the floor system may be void of laterally-extending metal cross members.

In still another illustrative embodiment, each of the upper and lower floor boards may include a planar body and a plurality of ribs extending perpendicularly outwardly from an inner surface of the planar body. Illustratively, each rib may include a body section having a first end coupled to the inner surface of the planar body and a foot section coupled to a second end of the body section. Further illustratively, the inner surface of the planar body of each of the upper floor boards may face the inner surface of the planar body of each of the lower floor boards.

According to yet another aspect of the present disclosure, a storage container, such as a trailer, includes a plurality of upper floor boards coupled to each other and a plurality of lower floor boards coupled to each other and configured to extend in a direction perpendicular to the plurality of upper floor boards. The plurality of lower floor boards are adjacent to and engaged with each other. The storage container further includes a sidewall coupled to at least one of the plurality of upper floor boards and at least one of the plurality of lower floor boards.

In one illustrative embodiment, the plurality of upper floor boards may extend laterally across a width of the trailer and the plurality of lower floor boards may extend longitudinally along a length of the trailer.

In another illustrative embodiment, the lower floor boards may be perpendicular to the upper floor boards In still another illustrative embodiment, the floor system may not include any I-beam cross members extending laterally across a width of the trailer.

In yet another illustrative embodiment, the bottom-most portion of the floor assembly may be the lower surface of the plurality of lower floor boards and may be open to the surrounding environment.

In another illustrative embodiment, the floor system may be generally void of a support structure between the plurality of lower floor boards and the ground upon which the storage container is supported.

In still another illustrative embodiment, the plurality of lower floor boards may each include a plurality of downwardly facing channels.

In another illustrative embodiment, the plurality of lower floor boards may each define the same cross-sectional shape as the cross-sectional shape of the plurality of upper floor boards.

In another illustrative embodiment, each of the plurality of upper and lower floor boards may include a planar body and a plurality of ribs coupled to an inside surface of the planar body. Illustratively, the inside surface of the planar body of each of the plurality of the upper floor boards may face the inside surface of the planar body of the each of the plurality of lower floor boards.

In still another illustrative embodiment, the storage container further includes a wheel assembly configured to be coupled directly to the plurality of lower floor boards.

According to another aspect of the present disclosure, a floor system configured for use with a storage container such as a trailer includes an upper floor section including upper floor boards which consist of a fiber reinforced polymer, and lower floor section including lower floor boards which consist of a fiber reinforced polymer. Illustratively, the cross-sectional shape of each of the upper and lower floor boards defines a plurality of generally U-shaped channels. In one illustrative embodiment, the U-shaped channels of the upper floor boards may be oriented downwardly and the U-shaped channels of the lower floor boards may be oriented upwardly. Alternatively, the U-shaped channels of the lower floor boards may be oriented downwardly.

DESCRIPTION OF THE ILLUSTRATIVE EMBODIMENTS

For the purposes of promoting an understanding of the principles of the invention, reference will now be made to illustrative embodiments shown in the attached drawings and specific language will be used to describe the same. While the concepts of this disclosure are described in relation to a truck trailer, it will be understood that they are equally applicable to other mobile or stationary storage containers, as well as refrigerated and un-refrigerated trailers or storage containers.

Figure 1:
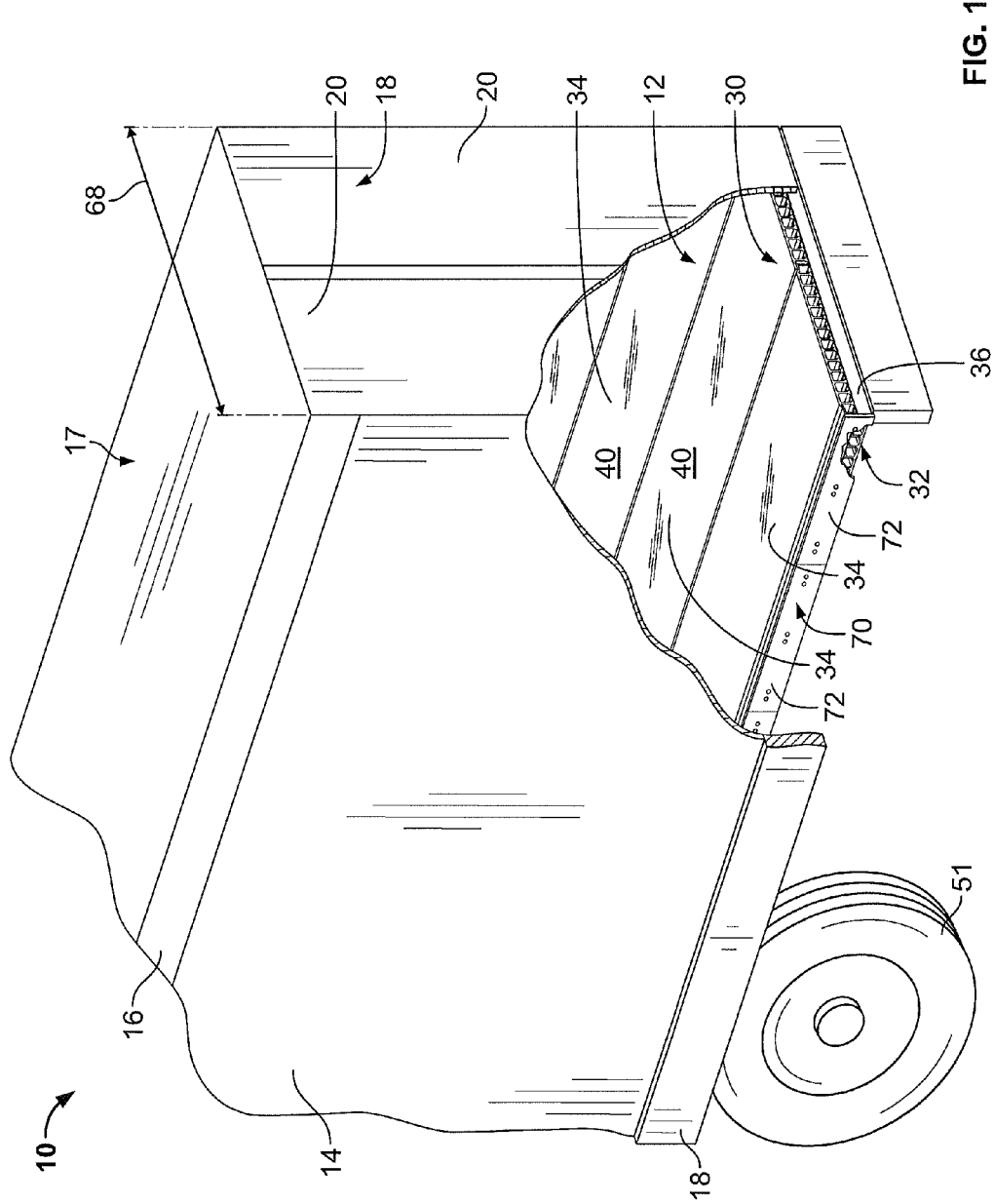
FIG. 1 is a perspective view of a portion of a trailer having a glass fiber floor system including an upper floor section and a lower floor section showing boards of the upper floor section extending longitudinally along a length of the trailer and showing boards of the lower floor section extending laterally across a width of the trailer.

Looking first to FIGS. 1 and 2, a trailer 10 includes a floor system 12, opposite side walls 14 extending along a length of the trailer 10, upper and lower rails 16, 18 coupled to each side wall 14, a roof assembly 16, a rear wall assembly 18 including the illustrative rear doors 20 or an overhead door (not shown), and a front wall assembly (not shown). Illustratively, the floor system 12 is a glass fiber floor system and includes an upper floor section 30 and lower floor section 32.

As shown in FIGS. 1 and 2, the upper floor section 30 includes a plurality of upper floor boards 34 and the lower floor section includes a plurality of lower floor boards, or panels, 36. Illustratively, each of the upper and lower floor boards 34, 36 are made of a glass fiber reinforced polymer and include glass fibers within a polymer resin. It should be understood that the boards, or panels, disclosed in FIGS. 1 and 2, as well as in FIGS. 3-10, are not made from and do not include any wood or wood products. As such, the term "board" and/or "panel", as used herein, does not necessarily include the use of wood or wood products. Also, unless noted otherwise, the term "board" and/or "panel" does not necessarily exclude the use of wood or wood products. The polymer resin may be a thermoplastic resin or a thermoset resin. As such, a variety, and any suitable combination, of glass and resin materials may be used. Further, the glass fibers may extend in any suitable direction. In other words, the glass fibers may extend along a longitudinal length of each board 34, 36, along a lateral width of each board 34, 36, along a height of each board 34, 36, at a desired angle to the length, width, or height of each board, and/or the glass fibers may be oriented randomly throughout the resin of each board 34, 36. In other words, the glass fibers may be oriented in any direction in order to provide additional strength to each board 34, 36 in any desired direction. Further, the glass fibers of each board 34, 36 may be woven or unwoven fibers. Illustratively, while each board 34, 36 includes glass fibers within the polymer resin, it should be understood that other suitable reinforcing fibers, such as carbon fibers, for example, may be used as well.

Each of the upper and lower floor boards 34, 36 includes a planar body 39 having an outer surface 40, an inner surface 41, and a plurality of ribs 42 extending generally perpendicularly away from the inner surface 41. Illustratively, the outer surface 40 is generally smooth to provide a smooth upper surface of the floor system 12, as is discussed below. The ribs 42 extend along a length of each of the upper and lower floor boards 34, 36 and are spaced apart from each other. Illustratively, the spacing between any two adjacent ribs 42 is generally equal to the spacing between any other two adjacent ribs 42. However, it is within the scope of this disclosure for the spacing between the ribs 42 of any floor board 34, 36 to be different from the spacing of any other floor board 34, 36 and/or from the spacing of any other adjacent ribs 42 on the same floor board 34, 36. In other words, the spacing between the ribs 42 may vary within the same floor board 34, 36 and/or may vary between different floor boards 34, 36. The ribs 42 cooperate with the inner surface 41 of each board 34, 36 to define generally U-shaped channels 43 of the boards 34, 36. As shown in FIG. 2B, the U-shaped channels 43 of the upper boards 34 are configured to face downwardly while the U-shaped channels 43 of the lower boards 36 are configured to face upwardly. Illustratively, each rib 42 includes a rib portion 44 and a foot portion 46 coupled to a distal end of the rib portion 44. Each foot portion 46 is generally perpendicular to the rib portions 44, as shown in FIG. 2B.

Further illustratively, each side of some of the boards 34, 36 includes a generally L-shaped side end portion 50 coupled to each side of the planar body 39 of the respective board 34, 36. As shown in FIG. 2B, for example, each L-shaped side end portion 50 is stepped-downwardly from the outer surface 40 of the planar body 39. Illustratively, while each side of some boards 34, 36 includes the stepped-down L-shaped portion 50, each side of some other boards 34,36 includes an outwardly-extending flange 52 coupled to and generally flush with the planar body 39. Illustratively, the flange 52 of these boards 34, 36 is configured to be coupled to the L-shaped portion 50 of each adjacent board 34, 36 in order to couple adjacent boards to each other. In particular, the flange 52 of each board 34, 36 is configured to rest on an upper surface of the horizontal portion of the L-shaped portion 50 of an adjacent board 34, 36. Illustratively, the flange 52 of one board 34 may be bonded to the horizontal portion of the L-shaped portion 50 of another board 34 via welding, adhesive, or other suitable mechanical fasteners such as rivets, nails, screws, bolts, etc. In the case of welding (i.e., fusing) adjacent boards 34 or 36 to each other, the flange 52 and the L-shaped portion 50 may be bonded to each other by generally heating and melting the respective adjacent flange 52 and L-shaped portion 50, positioning the flange 52 and adjacent L-shaped portion 50 together, and cooling the flange 52 and adjacent L-shaped portion 50 such that a chemical bond between the polymer resin of the two adjacent boards 34, 36 is formed. While some boards 34, 36 include the L-shaped side end portion 50 along each side of the planar body 39 of the board 34, 36 and other boards 34, 36 include the flange 52 along each side of the planar body 39 of the board 34, 36, it should be understood that each board 34, 36 may alternatively be configured to include the L-shaped side end portion 50 along one side of the planar body 39 and the flange 52 along the other side of the planar body 39 such that all boards 34, 36 are generally identical to each other.

Illustratively, each board 34, 36 generally has a height 60 in the range of approximately 1.0-2.5 inches and a width 62 in the range of approximately 12.0-23.0 inches. Each board 34, 36 is illustratively made by a pultrusion process. In particular, each board 34, 36, including the polymer material and the glass fibers, is pulled through a die to form the illustrative cross-sectional shape 34, 36 of the boards 34, 36 shown in FIGS. 1 and 2. Further illustratively, the glass pultrusion that is pulled through the die may be a woven fabric of glass which allows the glass fibers within the pultrusion to lie in any suitable direction. Thus, length (not shown) of each board 34, 36 may be manufactured as desired. Illustratively, while the boards 34, 36 are made by a pultrusion process, it is within the scope of this disclosure to make the boards 34, 36 using other suitable processes as well. As noted in greater detail below, the cross-sectional shape of each of the upper boards 34 and the lower boards 36 is generally identical.

As shown in FIGS. 1 and 2, the floor system 12 includes an upper floor section 30 and a lower floor section 32 Illustratively, the upper floor section 30 defines the surface of the floor system 12 exposed to the inner storage space of the trailer 10. In other words, the outer surface 40 of the upper boards 34 of the upper floor section 30 defines the surface of the floor system 12 which is exposed to, and facing, the inner storage space of the trailer 10. The ribs 42, therefore, of the upper floor section 30 generally extend downwardly from the inner surface 41 of the planar body 39 of each board 34. Further illustratively, the boards 34 of the upper floor section 30 are configured to extend longitudinally along a length (not shown) of the trailer 10. A typical trailer may have a length in the range of 24-53 feet. However, it should be understood that the floor system 12 may be used with a trailer 10 having any other suitable length. Illustratively, for example, if the illustrative trailer 10 were to define a length of approximately 24 feet, the length of each of the upper boards 34 would be approximately 24 feet as well. Accordingly, the length of each of the upper boards 34 of the trailer 10 is approximately the same as the overall length of the trailer 10 itself. It should be understood, however, that the length of each of the upper boards 34 may be less than the overall length of the trailer 10. Illustratively, therefore the length of the upper boards 34 of the illustrative trailer 10 may be less than 24 feet. In such an illustrative embodiment, more than one upper board 34 may be positioned end-to-end in order to span the overall length of the trailer 10.

Figure 2A:
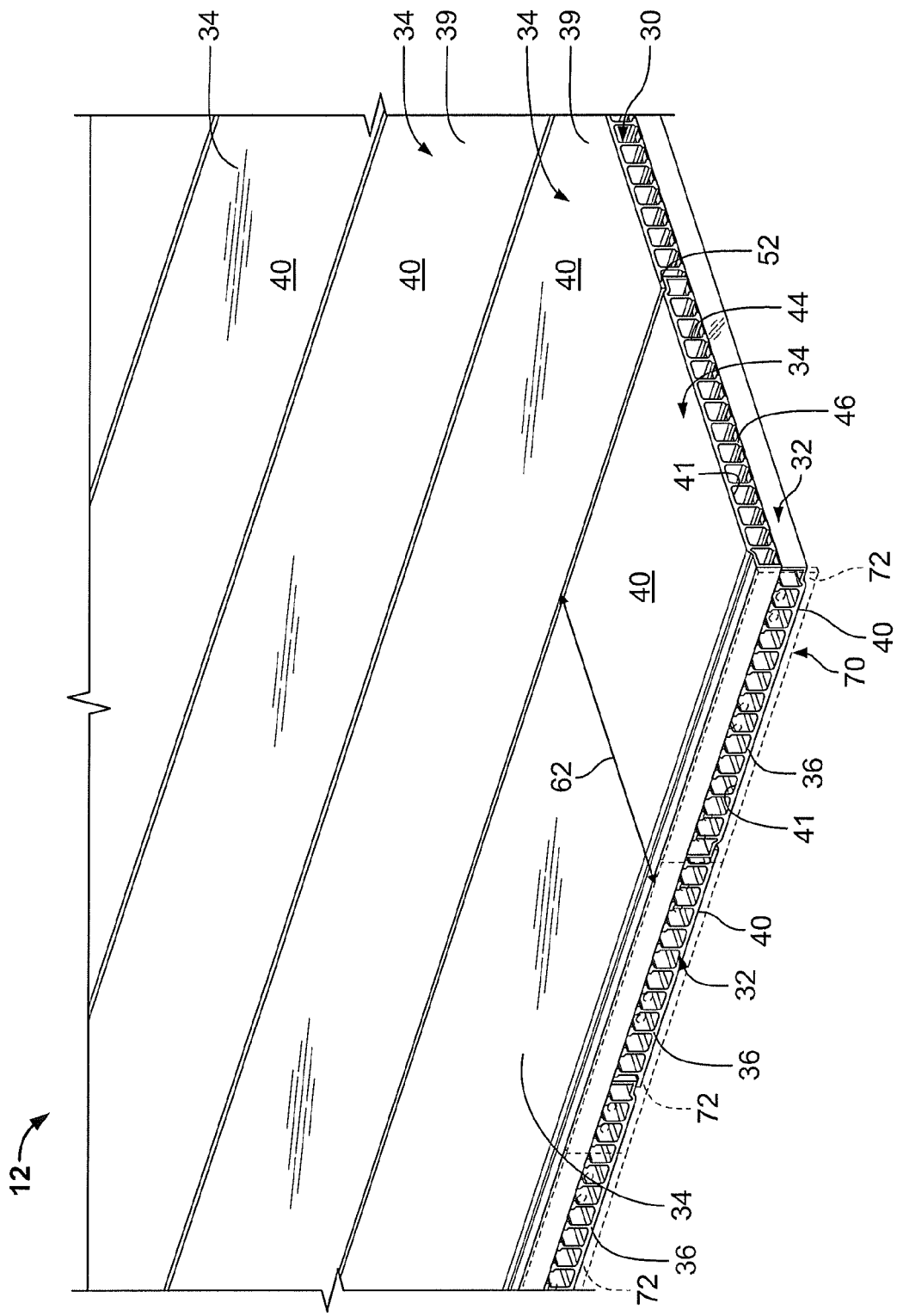
FIG. 2A is a perspective view of a portion of the glass fiber floor system of FIG. 1.
Figure 2B:
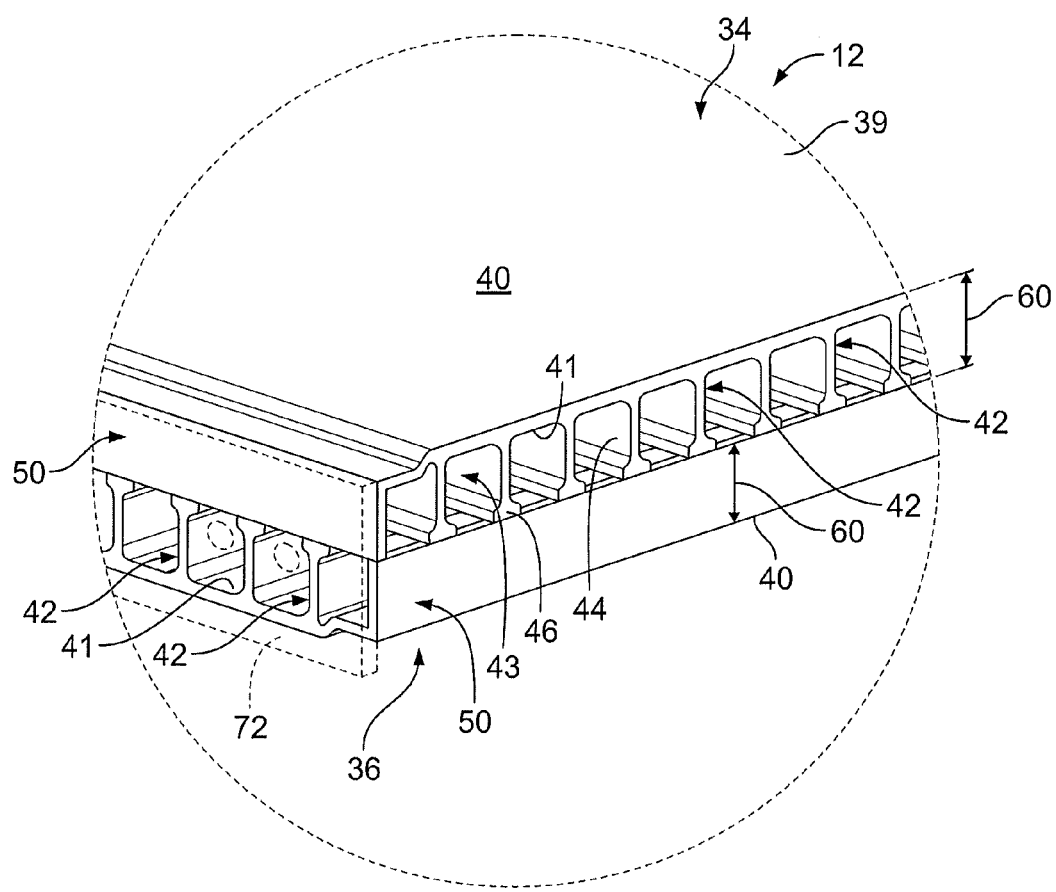
FIG. 2B is an enlarged, perspective view of a portion of the glass fiber floor system of FIGS. 1 and 2A.

Looking still to FIGS. 1, 2A, and 2B, the lower floor section 32 of the floor system 12 of the trailer 10 includes a plurality of lower boards 36. As discussed above, the lower boards 36 are the same as or similar to the upper boards 34. Thus, like reference numerals are used to denote like components. As shown in FIGS. 1 and 2A-2B, an inside surface 41 of the body 39 of the lower boards 36 is configured to face the inside surface 41 of the body 39 of the upper boards 34 such that the outer surface 40 of each of the upper boards 34 faces away from the outer surface 40 of each of the lower boards 36. In other words, as the floor system is oriented in FIGS. 1 and 2A-2B, the outer surface 40 of the upper boards 34 faces generally upwardly to define the upper surface of the floor system 12. The outer surface 40 of the lower boards 36, on the other hand, faces generally downwardly. As such, a bottom surface of the foot portions 46 of the ribs 42 of each of the upper and lower boards 34, 36 are engaged with each other.

As shown in FIGS. 1 and 2A-2B, the lower boards 36 of the lower floor section 32 are configured to extend laterally across a width 68 of the trailer 10. A typical trailer 10 may have a width of approximately 101 inches. Accordingly, each illustrative lower board 36 of the trailer 10 has a length of approximately 101 inches. Of course, it is within the scope of this disclosure to use the floor system 12 with a trailer 10 having another suitable width. As such, it is within the scope of this disclosure for the lower boards 36 of the floor system 12 to have another suitable length in order to accommodate a trailer having a different width. Alternatively, more than one lower board 36 having a length less than the 101 inch width 68 of the trailer 10 may be laid end-to-end in order to suitably span the width 68 of the trailer 10, or any other trailer, having such a floor system.

Illustratively, adjacent lower floor boards 36 are coupled to each other in the same manner as the adjacent upper floor boards 34, as described above. Accordingly, the flange 52 of one board 36 may be bonded to the horizontal portion of the L-shaped portion 50 of another board 34 via welding (i.e., fusing), adhesive, or other suitable mechanical fasteners such as rivets, nails, screws, bolts, etc.

Further illustratively, the upper floor boards 34 and the lower floor boards 36 are coupled to each other such that the upper floor section 30 and the lower floor section 32 are coupled to each other. The upper and lower floor boards 34, 36 may be coupled to each other using any suitable fastening means. As such, the bottom surface of the foot portion 46 of the ribs 42 of the upper and lower boards 34, 36 may be coupled to each other via welding, adhesive, or with the use of other suitable mechanical fasteners such as rivets, nails, screws, bolts, etc. In the case of welding (i.e., heat fusing), the bottom surfaces of the foot portions 46 of the upper and lower boards 34, 36 may be bonded, or fused, to each other by generally melting the bottom surface of the foot portions 46 of the respective upper and lower boards 34, 36, positioning the bottom surface of adjacent upper and lower boards 34, 36 together, and cooling the foot portions 46 such that a chemical bond between the polymer resin of the foot portions 46 of two adjacent upper and lower boards 34, 36 is formed.

Illustratively, while the upper and lower boards 34, 36 each define a particular cross-sectional shape including the upper planar body 39 and ribs 42 hanging downwardly from the planar body 39, it is within the scope of this disclosure to provide a floor system having upper and lower boards defining other suitable cross-sectional shapes. In other words, various factors such as the method of joining adjacent and upper and lower boards 34, 36 to each other as well as the desired strength and/or weight desired may affect the desired cross-sectional shape of each of the upper and lower boards 34, 36 of the floor system 12. Further, while illustrative the upper and lower boards 34, 36 shown in FIGS. 1 and 2A-2B are generally the same in cross-sectional shape, width, and height, it should be understood that these characteristics of the upper and lower boards 34, 36 may differ from each other. Further, boards 34 within the upper floor section 30 and boards 36 within the lower floor section 32 may similarly differ from each other in shape, width, and height. As noted above, the length of the boards 34, 36 may differ as well.

Illustratively, as noted above, the upper floor section 30 includes boards 34 which extend longitudinally along a length of the trailer 10 while the lower floor section 32 includes boards 36 which extend latitudinally across the width 68 of the trailer 10. As such, the boards 34 of the upper floor section 30 are perpendicular to the boards 36 of the lower floor section 32. It should further be noted that the illustrative floor system 12 of the trailer 10 does not include any I-beam cross members typical of a floor system for a trailer or other such storage container. Rather, the floor system 12 includes only a plurality of generally identical glass fiber boards 34, 36 forming upper and lower floor sections 30, 32. As such, the outer surface 40 of the lower boards 36 of the lower floor section 32 is configured to be open to the surrounding environment and generally provides the bottommost structure of the floor system 12 of the trailer 10. In other words, the floor system 12 of the illustrative trailer 10 does not include any other supporting members other than the upper and lower floor sections 30, 32 such that the bottom surface 40 of the lower floor section 30 forms the bottommost surface of floor system 12. Illustratively, for example, the trailer 10 includes a wheel assembly including wheels 51 which is coupled directly to the plurality of lower floor boards 34 of the lower floor section 32.

Looking again to FIGS. 1 and 2, the illustrative floor system 12 further includes an attachment plate 70 coupled to the upper and lower floor boards 34, 36. In particular, the attachment plate 70 is coupled along a length of the upper floor boards 34 on either side of the floor system 12 and is, therefore, also coupled to the front and back ends of the lower floor boards 36 of the floor system 12. As is discussed in greater detail below, the attachment plate 70 is coupled to the both the upper and lower floor boards 34, 36 as well as the respective side wall 14 of the trailer 10. In other words, the attachment plate 70 operates to couple the floor system 12 to the side wall 14 of the trailer 10.

Illustratively, the attachment plate 70 includes a plurality of plate sections 72 adjacent each other and positioned along a length of the outer-most upper board 34 along each side of the floor system 12. Illustratively, each plate section 72 has a length approximately the same as the width of the upper and lower boards 34, 36. However, it is within the scope of this disclosure to provide plate sections of any suitable length. Further, while the attachment plate 70 includes multiple plate sections 72, it is within the scope of this disclosure to provide a single attachment plate 70 having a length generally the same as the length of the upper floor boards 34.

Illustratively, the attachment plate sections 72 may each be made from a glass fiber pultrusion and may include glass fibers in a polymer resin. In other words, the plate sections 72 may be made from the same as or a similar material as each of the upper and lower floor boards 34, 36. Illustratively, such attachment plate sections 72 may be coupled to the upper and lower floor boards 34, 36 through the use of an adhesive. Alternatively, the attachment plate sections 72 may be welded (i.e., fused) to the upper and lower floor boards 34, 36 using heat to melt or partially melt portions of the plate sections 72 to adjacent portions of the upper and lower floor boards 34, 36. Alternatively, mechanical fasteners such as rivets, nails, screws, bolts, etc, may be used to couple the plate sections 72 with the upper and lower floor boards 34, 36 as well. Further alternatively, the plate sections 72 may be made from other suitable materials including metals such as steel or aluminum, for example, or wood. Accordingly, such plate sections may be coupled to the upper and lower floor boards 34, 36 through the use of an adhesive and/or mechanical fasteners such as those illustratively described above.

Figure 3:
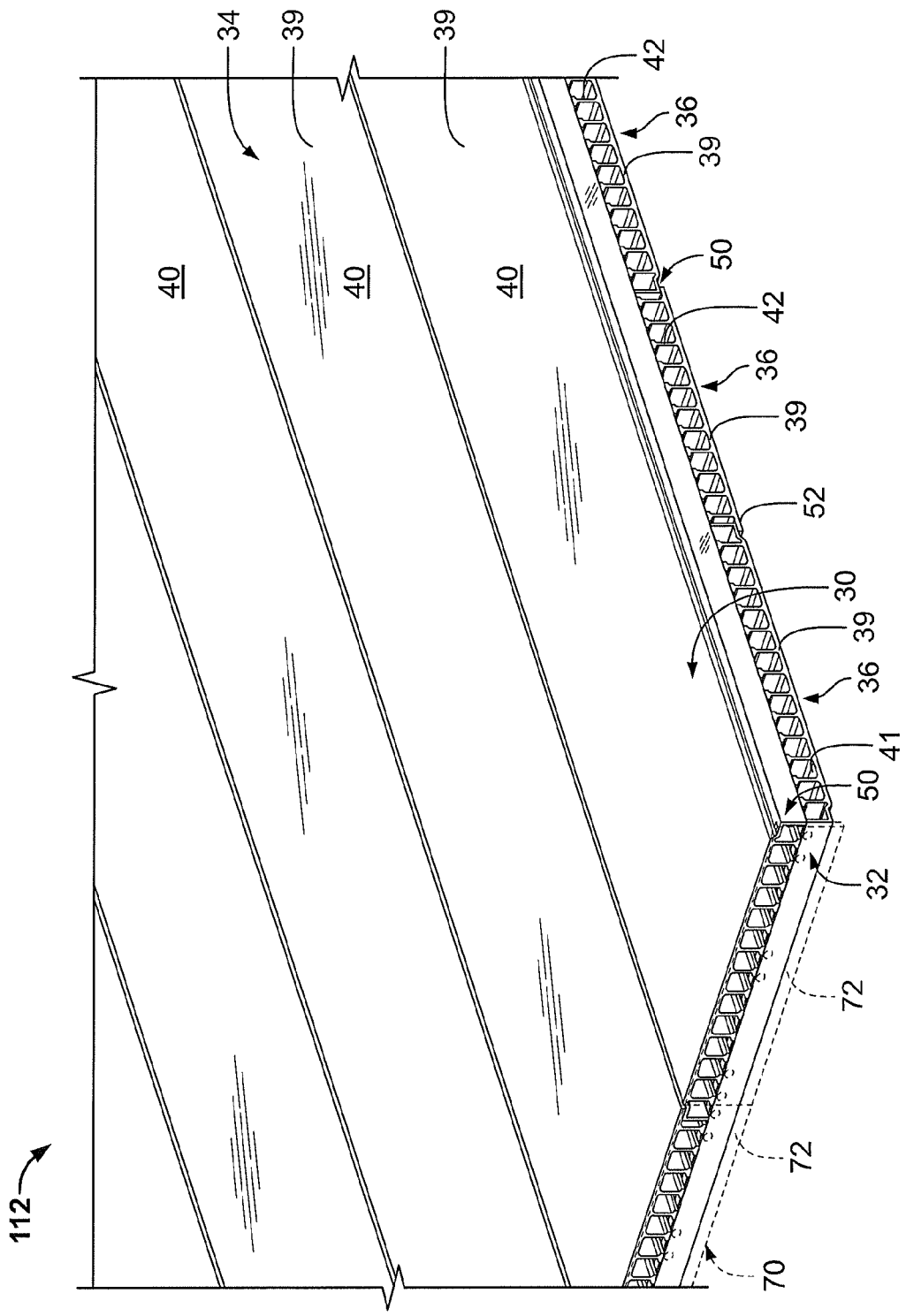
FIG. 3 is a perspective view of a portion of another glass fiber floor system including an upper floor section and a lower floor section showing boards of the upper floor section extending laterally across a width of the trailer and showing boards of the lower floor section extending longitudinally along a length of the trailer.

Looking now to FIG. 3, another floor system 112 for a trailer, such as the trailer 10, is provided. Illustratively, various components of the floor system 112 are the same as or similar to the components of the floor system 12 described above and shown in FIGS. 1 and 2A-2B. Accordingly, like reference numerals are used to denote like components. Illustratively, the floor system 112 includes the upper and lower floor boards 34, 36. However, the upper floor boards 34 are configured to extend laterally across the width 68 of the trailer 10 while the lower floor boards 36 are configured to extend longitudinally along a length of the trailer 10. In other words, each of the upper and lower floor boards 34, 36 are rotated 90 degrees from their orientation in the floor system 12 shown in FIGS. 1 and 2. However, the upper and lower floor boards 34, 36 of the floor system 112 remain positioned to lie in a perpendicular orientation to each other. Accordingly, the attachment plate 70 is coupled to the front and back ends of each of the upper floor boards 34 and is coupled to the side surface of the right and left outermost lower boards 36.

Figure 4:
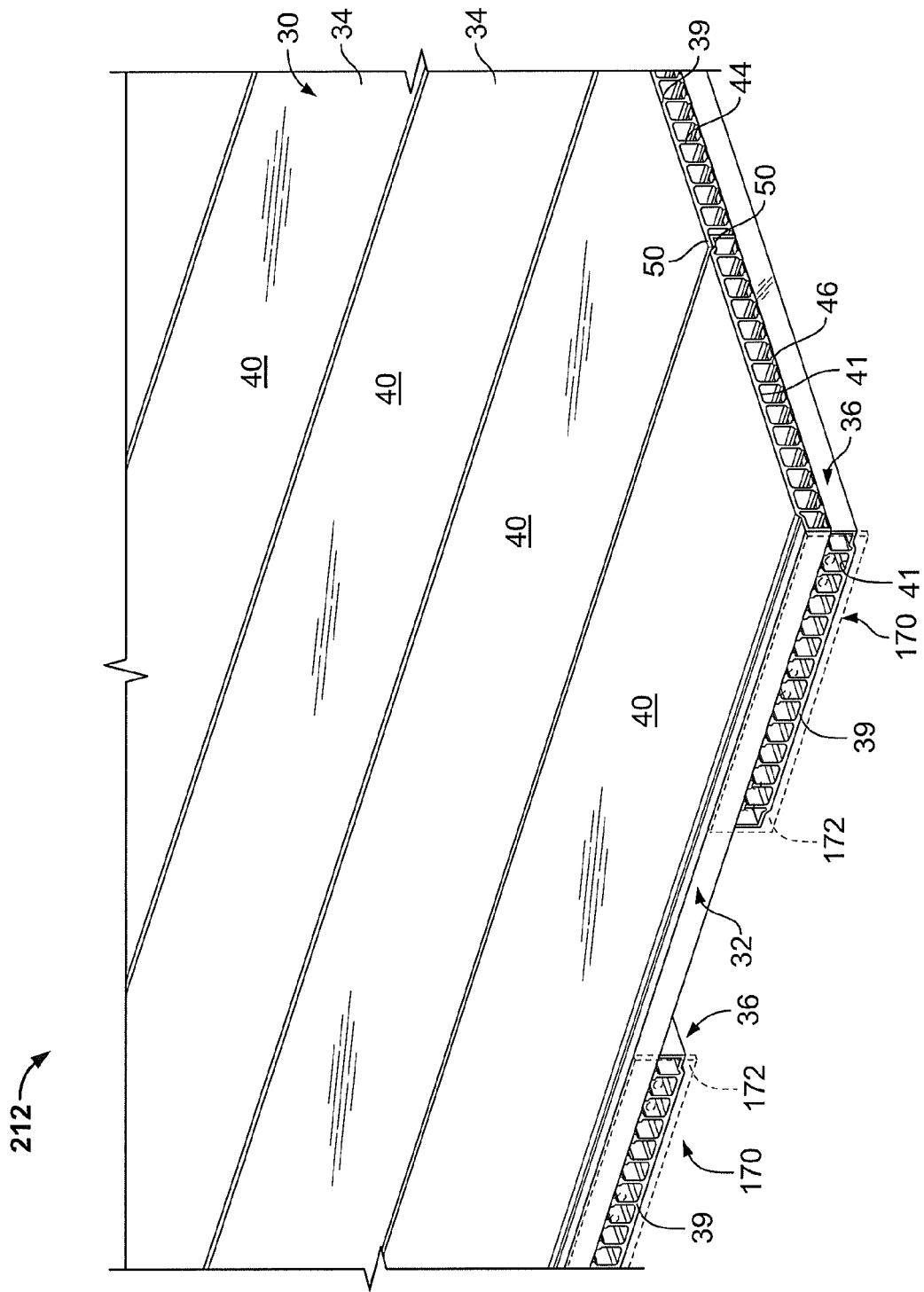
FIG. 4 is a perspective view of a portion of yet another glass fiber floor system similar to the glass fiber floor system of FIGS. 1 and 2 showing the boards of the lower floor section spaced-apart from each other.

Looking now to FIG. 4, another floor system 212 for a trailer, such as the trailer 10, is provided. Illustratively, various components of the floor system 212 are the same as or similar to the components of the floor systems 12, 112 described above and shown in FIGS. 1-2A-2B. Accordingly, like reference numerals are used to denote like components. Illustratively, the floor system 212 includes the upper and lower floor boards 34, 36. Further, the orientation of the upper floor boards 34 of the floor system 212 is generally the same as or similar to the orientation and layout of the upper floor boards 34 of the floor system 12 shown in FIGS. 1 and 2A-2B. However, the lower floor boards 34 are intermittently positioned in spaced-apart relation to each other. In other words, while the upper floor boards 34 of the floor system 212 are engaged with and coupled to each adjacent upper floor board 34 in order to provide a generally continuous upper surface 40 of the floor system 212, the lower floor boards 36 of the floor system 212 are not engaged with each other and are not directly coupled with each other. Rather, the lower floor boards 36 of the floor system 212 are spaced-apart from each other. Illustratively, the lower floor boards 36 of the floor system 212 are spaced-apart from each other at regular intervals such that the spacing between each adjacent floor board 36 is generally the same. It should be understood, however, that the spacing between adjacent floor boards 36 may be different from the spacing between a different pair of adjacent floor boards 36. Illustratively, the lower floor boards 36 may be positioned to extend laterally along the width of the trailer at the front and/or rear ends of the trailer. Alternatively, the lower floor boards 36 may be positioned inwardly from both of the front and rear ends of the floor system 212 such that a front and rear portion of the upper floor section of the floor system 212 extends away from of hangs over the lower floor boards 36. Further illustratively, it should be understood that the floor system 212 may also include adjacent lower floor boards 36 which are engaged with and/or coupled to each other in addition to adjacent lower floor boards 36 which are spaced-apart from each other. In other words, the floor system 212 may include adjacent lower floor boards 36 which are engaged with each other in addition to adjacent lower floor boards 36 which are spaced-apart from each other. Illustratively, the upper and lower floor boards 34, 36 of the floor system 212 remain positioned to lie in a perpendicular orientation to one another.

Looking still to FIG. 4, an alternative attachment plate 170 includes spaced-apart attachment plate sections 172 each coupled to the ends of one of the lower floor boards 36. Accordingly, the attachment plate 170 does not extend continuously from the front of the floor system 212 to the rear of the floor system 212. Rather, the attachment plate sections 172 of the attachment plate 170 are spaced-apart from each other and coupled to the ends of the lower floor boards 36. As such, where there are no lower floor boards 36, the floor system 212 does not include any attachment plate sections 172. Illustratively, as described above in regard to the attachment plate 70 shown in FIGS. 1 and 2A-2B while the attachment plate sections 172 are only present in locations where there are lower floor boards 36, it should be understood that the attachment plate sections 172 are coupled to both the ends of the lower floor boards 36 and to the adjacent sidewall portions of the upper floor board 34. As noted above, the attachment plate sections 172 may be welded (i.e., fused) to the upper and lower floor boards 34, 36 using heat to melt or partially melt portions of the plate sections 72 to adjacent portions of the upper and lower floor boards 34, 36. Alternatively, mechanical fasteners such as rivets, nails, screws, bolts, etc, may be used to the couple the plate sections 62 with the upper and lower floor boards 34, 36 as well. Illustratively, while the floor system 212 includes intermittent, spaced-apart attachment plate sections 172, it should be understood that the floor system 212 may also include attachment plate sections which are coupled to sidewall portions of the right and left outermost upper floor boards 34 which do not have a lower floor board 36 positioned directly underneath. Accordingly, the attachment plate sections 172 of the floor system 212 need not be located only where a lower floor board 36 is present, but may be positioned at other locations along the length of the floor system 212 as well.

Figure 5:
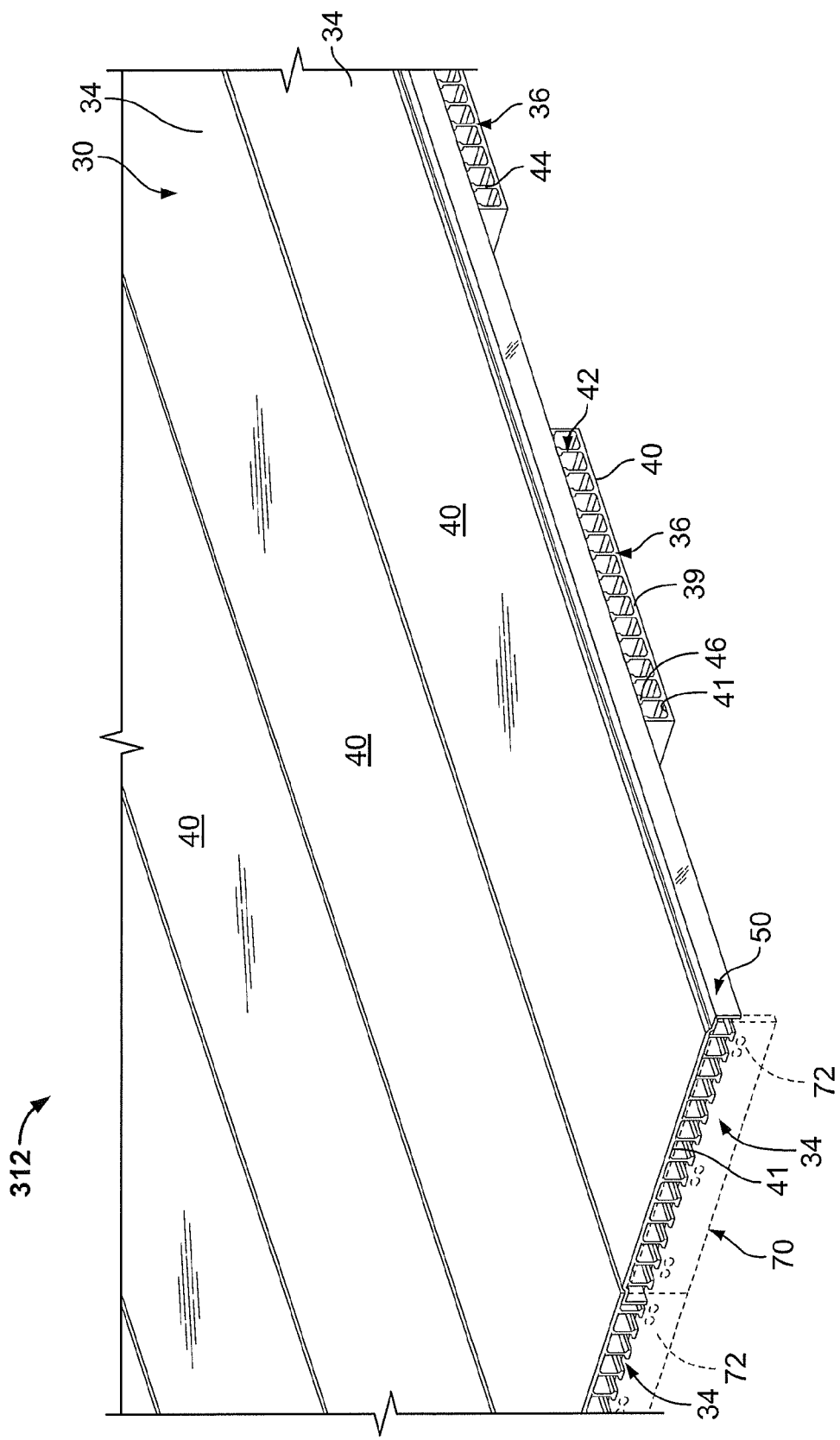
FIG. 5 is a perspective view of a portion of still another glass fiber floor system similar to the glass fiber floor system of FIG. 3 showing the boards of the lower floor section spaced-apart from each other.

Looking now to FIG. 5, another floor system 312 for a trailer, such as the trailer 10, is provided. Illustratively, various components of the floor system 312 are the same as or similar to the components of the floor systems 12, 112, 212 described above and shown in FIGS. 1-4. Accordingly, like reference numerals are used to denote like components. Illustratively, the floor system 312 includes the upper and lower floor boards 34, 36. Further, the orientation of the upper floor boards 34 of the floor system 212 is generally the same as or similar to the orientation and layout of the upper floor boards 34 of the floor system 12 shown in FIG. 3. However, the lower floor boards 34 are intermittently positioned in spaced-apart relation to each other, similar to that shown in the floor system 212 of FIG. 4. In other words, the upper floor boards 34 of the floor system 312 extend laterally across the width 68 of the trailer and are also engaged with and coupled to each adjacent upper floor board 34 in order to provide a generally continuous upper surface 40 of the floor system 312. The lower floor boards 36 of the floor system 312, on the other hand, extend longitudinally along a length of the trailer, are not engaged with each other, and are not directly coupled with each other. Rather, the lower floor boards 36 of the floor system 312 are spaced-apart from each other. Illustratively, the lower floor boards 36 of the floor system 312 are spaced-apart from each other at regular intervals such that the spacing between each adjacent floor board 36 is generally the same. It should be understood, however, that the spacing between adjacent floor boards 36 may be different from the spacing between a different pair of adjacent floor boards 36.

Further illustratively, the floor system 312 does not include any lower floor boards 36 at the right and left sides of the floor system 312. In other words, the floor boards 36 of the floor system 312 are positioned inwardly from both of the right and left sides of the floor system 312 such that a right and left portion of the upper floor section of the floor system 312 extends away from or hangs over the lower floor boards 36, as shown in FIG. 5. Illustratively, it should be understood, however, that the lower floor boards 36 may be positioned to extend longitudinally along the length of the trailer at the right and/or left sides of the trailer. Further illustratively, it should be understood that the floor system 312 may also include adjacent lower floor boards 36 which are engaged with and/or coupled to each other in addition to adjacent lower floor boards 36 which are spaced-apart from each other. In other words, the floor system 312 may include adjacent lower floor boards 36 which are engaged with each other in addition to adjacent lower floor boards 36 which are spaced-apart from each other. Illustratively, the upper and lower floor boards 34, 36 of the floor system 312 remain positioned to lie in a perpendicular orientation to each other.

Looking still to FIG. 5, the floor system 312 includes the attachment plate 70. The attachment plate 70 of the floor system 312 shown in FIG. 5 is the same as or similar to the attachment plate 70 of the floor system 112 shown in FIG. 3. In other words, the attachment plate 70 of the floor system 312 includes a plurality of attachment plate sections 72 adjacent each other and configured to extend along a length of the trailer. Illustratively, however, because the illustrative floor system 312 shown in FIG. 5 does not include any lower floor boards 36 which are positioned along either of the right and left sides of the floor system 312, the attachment plate sections 72 are coupled to only the front and rear ends of the upper floor boards 34. The attachment plate sections 72 may be welded (i.e., fused) to the upper floor boards 34 using heat to melt or partially melt portions of the plate sections 72 to the ends of the upper floor boards 34. Alternatively, mechanical fasteners such as rivets, nails, screws, bolts, etc, may be used to the couple the plate sections 72 with the upper floor boards 34 as well. It should be understood, however, that the floor system 312 may include lower floor boards 36 positioned along the right and left sides of the floor system 312 such that the attachment plate sections 72 may also be coupled to the sidewall of the such right and left most lower floor boards 36.

Figure 6:
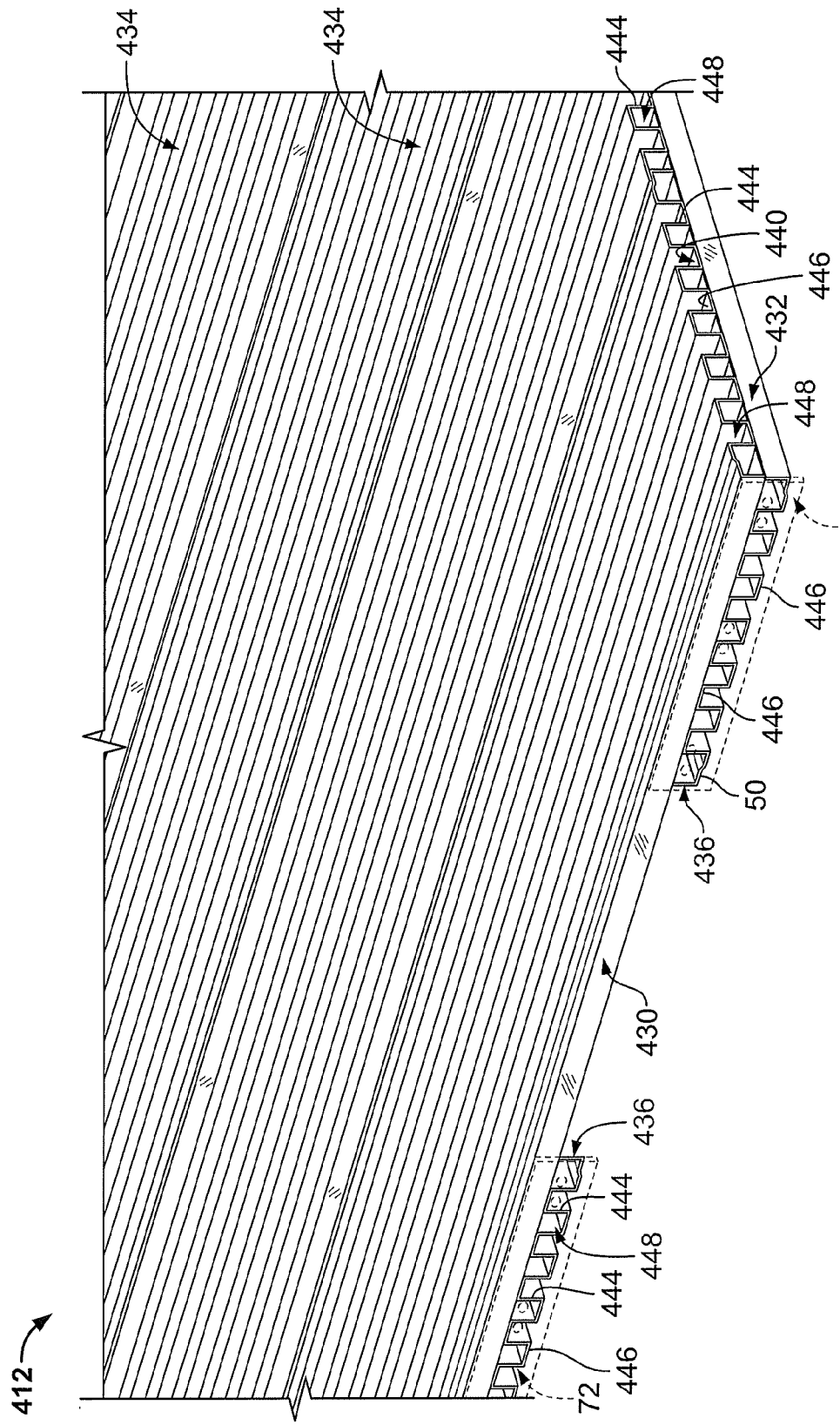
FIG. 6 is a perspective view of a portion of another glass fiber floor system having corrugated upper and lower floor sections.

Looking now to FIG. 6, another floor system 412 is provided. Illustratively, the floor system 412 includes an upper floor section 430 and a lower floor section 432. The upper floor section 430 includes a plurality of upper floor boards 434 while the lower floor section 432 includes a plurality of lower floor boards 436. The upper floor boards 434 form a corrugated upper floor surface 440 of the floor system 412. Illustratively, therefore, the upper floor boards 434 include a plurality of spaced-apart vertical walls 444 and a plurality of horizontal walls 446 coupled to the vertical walls 444 to create the generally U-shaped corrugations of the floor boards 436.

The upper and lower floor boards 434, 436 further include L-shaped side end portions 50 coupled to each side of corrugations of the respective board 34, 36. As shown in FIG. 6. Illustratively, while each side of some boards 434, 436 includes the stepped-down L-shaped portion 50, each side of some other boards 434, 436 includes the outwardly-extending flange 52 coupled to and generally flush one of the horizontal walls 446 of the corrugations. As is discussed in greater detail above, the flange 52 of these boards 434, 436 is configured to be coupled to the L-shaped portion 50 of each adjacent board 434, 436 in order to couple adjacent boards to each other. In particular, the flange 52 of each board 434, 436 is configured to rest on an upper surface of the horizontal portion of the L-shaped portion 50 of an adjacent board 434, 436. Illustratively, the flange 52 of one board 434 may be bonded to the horizontal portion of the L-shaped portion 50 of another board 434 via welding, adhesive, or other suitable mechanical fasteners such as rivets, nails, screws, bolts, etc. While some boards 434, 436 include the L-shaped side end portion 50 along each side of the corrugations and other boards 434, 436 include the flange 52 along each side of the corrugations, it should be understood that each board 434, 436 may be configured to include the L-shaped side end portion 50 along one side of the corrugations and the flange 52 along the other side of the corrugations.

Illustratively, the lower floor boards 434 are the same as or similar to the upper floor boards 436. As with the upper and lower floor boards 34, 36 described above, each of the upper and lower floor boards 434, 436 are made of a glass fiber reinforced polymer and include glass fibers within a polymer resin. The polymer resin may be a thermoplastic resin or a thermoset resin such that a variety, and any suitable combination, of glass and resin materials may be used. The glass fibers may also extend in any suitable direction or may be oriented randomly throughout the resin of each board 434, 436. Further, the glass fibers of each board 434, 436 may be woven or unwoven fibers. Illustratively, while each board 434, 436 includes glass fibers within the polymer resin, it should be understood that other suitable reinforcing fibers, such as carbon fibers, for example, may be used as well.

As shown in FIG. 6, the upper floor boards 434 and the lower floor boards 436 are perpendicular to each other. Illustratively, the upper floor boards 434 extend longitudinally along a length of the trailer while the lower floor boards 436 extend latitudinally along a width of the trailer. However, it should be understood, as with the upper and lower floor boards 34, 36, that the upper and lower floor boards 434, 436 may also be positioned such that the upper floor boards 434 extend latitudinally across a width of the trailer while the lower floor boards 436 extend longitudinally along a length of the trailer. Further, in either orientation, the lower floor boards 436 may be positioned adjacent to each other such that the lower floor boards 436 are engaged with and coupled to one another. Alternatively, one or more of the lower floor boards 436 may be spaced-apart from each other, such as that which is illustratively shown in FIG. 6, for example.

Illustratively, the corrugated shape of the upper and lower boards 434, 436 of the floor system 412 shown in FIG. 6 may be used in a refrigerated trailer (not shown). Illustratively, the corrugations of the upper floor boards 434 provide upwardly-facing U-shaped channels 448 or ducts which typically remain open to allow air to flow therethrough in order to further assist in the cooling of the storage area of the refrigerated trailer.

Figure 7:
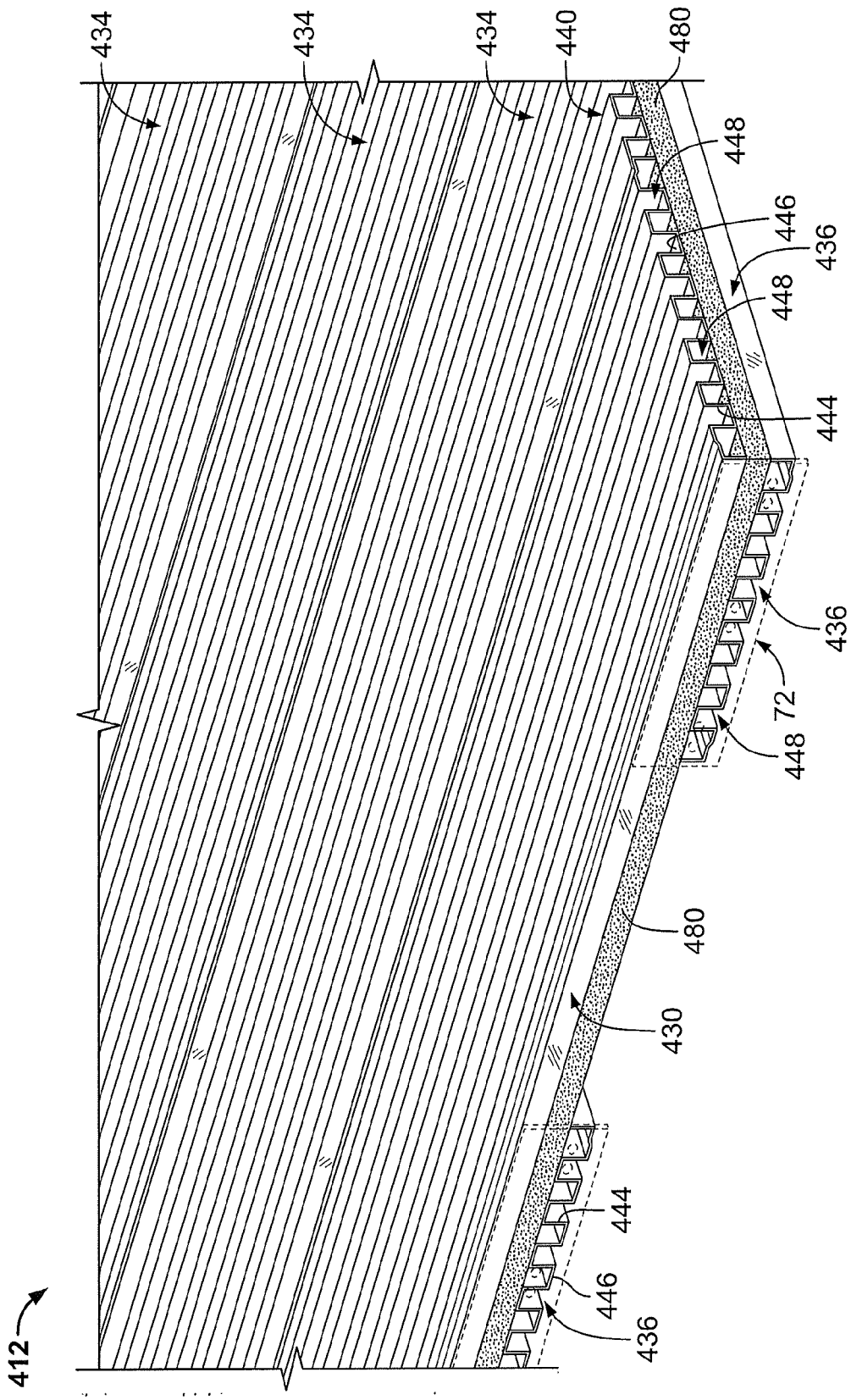
FIG. 7 is a perspective view of a portion of the glass fiber floor system of FIG. 6 including a spacer positioned between the upper and lower sections.

As shown in FIG. 7, the floor system 412 may also be provided with a spacer 480 between the upper floor section 430 and the lower floor section 432. Illustratively, the spacer 480 is made from an insulating material, such as a urethane foam, for example. However, it is within the scope of this disclosure to provide a spacer made from other suitable insulating and non-insulating materials including, but not limited to, plastic, balsa wood, etc.

Illustratively, the spacer 480 may be coupled to one or both of the upper and lower floor sections 430, 432 through the use of an adhesive, such as a spray adhesive or an adhesive film, for example. For a spacer 480 made of the same or similar material as that of the upper and lower floor sections 430, 432 (i.e., a fiber reinforced polymer), the spacer 480 may be welded to one or both of the upper and lower floor sections 430, 432. Further, mechanical fasteners such as rivets, bolts, nails, screws, etc., may be used as well in order to couple the spacer 480 to one or both of the upper and lower floor sections 430, 432. It should also be understood that the spacer 480 need not necessarily be coupled to either of the upper and lower floor sections 430, 432. Illustratively, the spacer 480 is approximately 1-2 inches thick; however, it should be understood that a spacer having any suitable thickness may be used as well.

Figure 8:
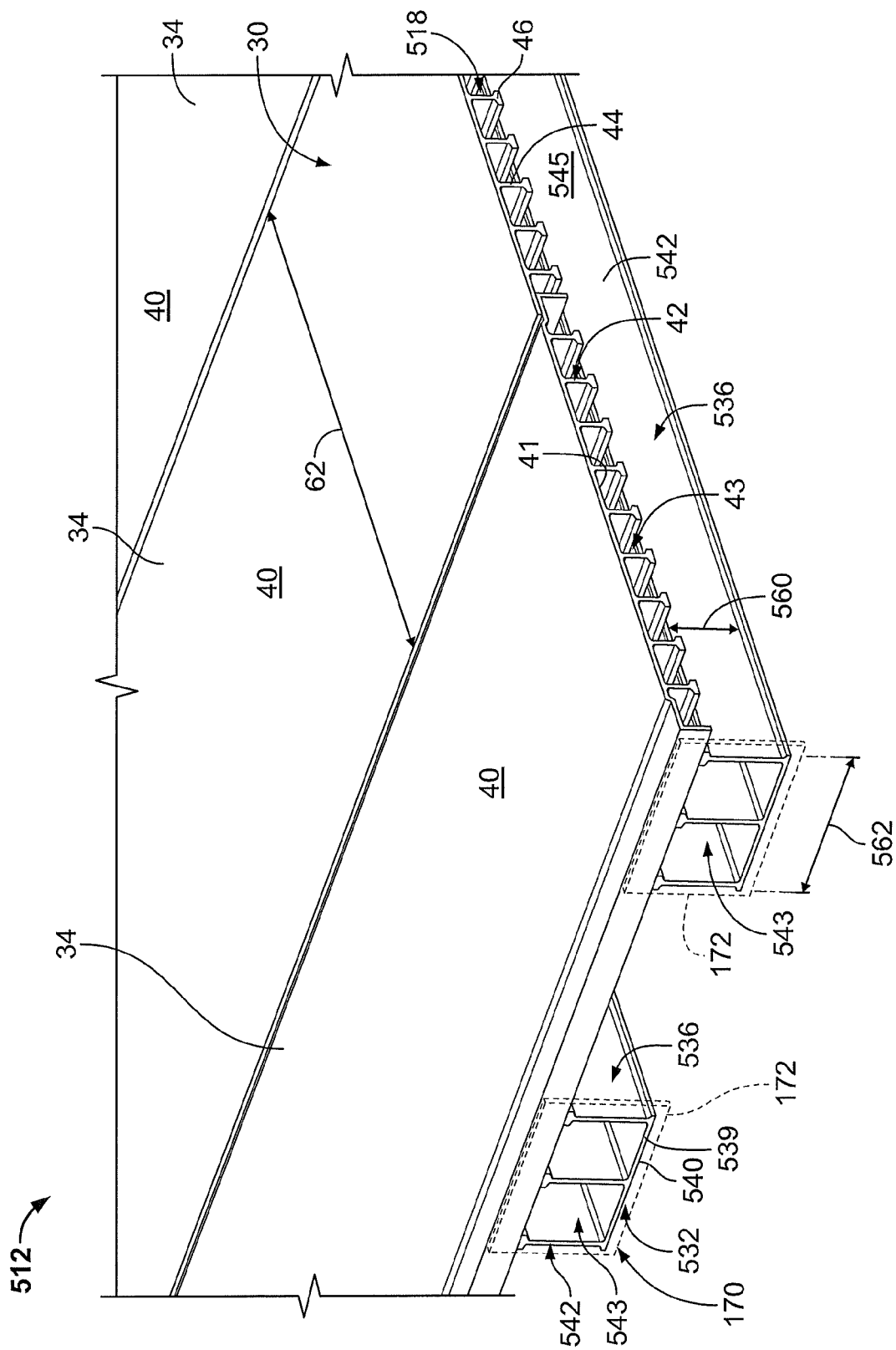
FIG. 8 is a perspective view of a portion of still another glass fiber floor system showing the boards of the lower floor section spaced-apart from each other and recessed from a rear end of the boards of the upper floor section.

Looking now to FIG. 8, another floor system 512 is provided. Illustratively, the floor system 512 includes the upper floor section 30 shown in FIGS. 1-2B and 4 and a lower floor section 532. Various components of the floor system 512 are the same as or similar to the components of the floor systems 12, 112, 212 described above and shown in FIGS. 1-4. Accordingly, like reference numerals are used to denote like components. Illustratively, the orientation of the upper floor boards 34 of the floor system 512 is generally the same as or similar to the orientation and layout of the upper floor boards 34 of the floor system 12 shown in FIGS. 1-2B and 4. In other words, the upper floor boards 34 extend longitudinally along a length of the trailer 10. The lower floor boards 536 are intermittently positioned in spaced-apart relation to each other similar to the lower floor boards 36 shown in FIG. 4. In other words, while each of the upper floor boards 34 of the floor system 512 is engaged with and coupled to each adjacent upper floor board 34 in order to provide a generally continuous upper surface 40 of the floor system 512, the lower floor boards 536 of the floor system 512 are not engaged with each other and are not directly coupled with each other. Illustratively, the lower floor boards 36 may be spaced any suitable distance apart from each other.

Further, the lower floor boards 536 are recessed from a rear end 518 of the upper floor boards 34 such that an outer surface 545 of an end-most rib 542 of the end-most lower floor board 536 generally defines a vertical plane that is spaced-apart from a vertical plane generally defined by the rear end 518 of the upper floor boards 34. Illustratively, the end-most lower floor board 536 may be recessed forwardly from the rear end 518 of the upper floor boards 34 any suitable distance. Illustratively, a height 560 of the lower floor boards 536 is greater than the height 60 of the upper floor boards 34. In particular, the height 560 of the lower floor boards 536 is approximately twice the height 60 of the upper floor boards 34. It should be understood, however, that the height of each of the upper and lower floor boards 34, 536 may be different from each other in any suitable manner and amount such that the height 560 of the lower floor boards 536 may be generally greater than, equal to, or less than the height 60 of the upper floor boards 34. Finally, as shown in FIG. 8, a width 562 of each of the lower floor boards 536 is less than the width 62 of each of the upper floor boards 34 and contains fewer U-shaped channels 543 than the number of U-shaped channels 43 of each of the upper floor boards 34. In particular, the width 562 of each of the lower floor boards 536 is approximately one third the width 62 of each of the upper floor boards 34. It should be understood, however, that the width of each of the upper and lower floor boards 34, 536 may be different from each other in any suitable manner and amount such that the width 562 of the lower floor boards 536 may be generally greater than, equal to, or less than the width 62 of the upper floor boards 34.

Figure 9:
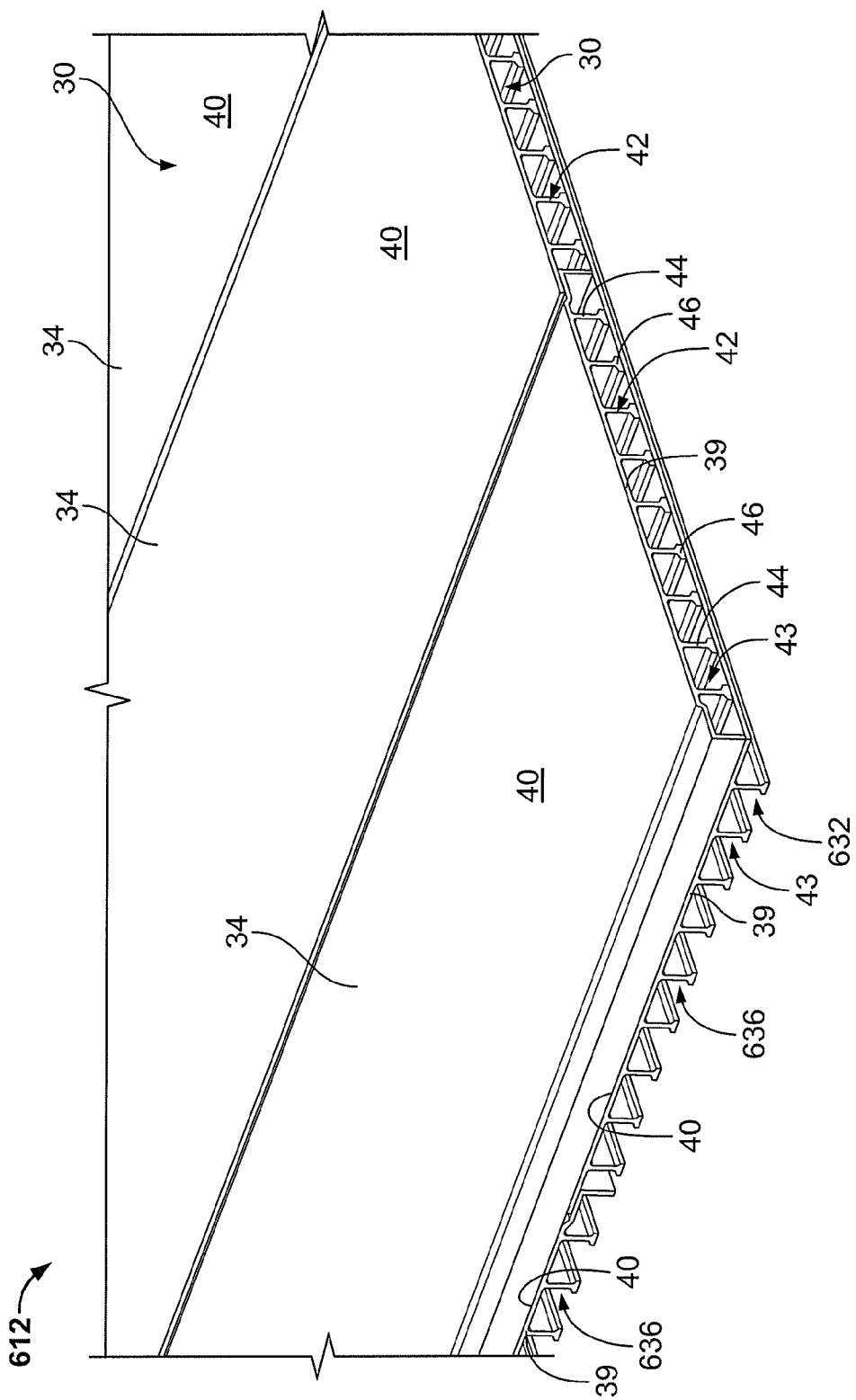
FIG. 9 is a perspective view of a portion of yet another glass fiber floor system showing the boards of the lower floor section oriented upside down relative to the boards of the lower floor sections shown in FIGS. 1-5 and 8 such that a planar surface of the lower floor section is engaged with upper floor section.

Looking now to FIG. 9, still another floor system 612 is provided. Illustratively, the floor system 612 includes the upper floor section 30 shown in FIGS. 1-2B, 4, and 8 and a lower floor section 632 coupled thereto. Various components of the floor system 612 are the same as or similar to the components of the floor systems 12, 112, 212 described above and shown in FIGS. 1-4. Accordingly, like reference numerals are used to denote like components. Illustratively, the lower floor section 632 includes lower floor boards 636 which are oriented upside down relative to the lower floor boards 36 shown in FIGS. 1-4 such that the lower floor section 632 of the floor system 612 shown in FIG. 9 is generally upside-down, or reversely oriented, as compared to the lower floor section 32 of the floor systems 12, 112, 212 shown in FIGS. 1-4. In particular, the surface 40 of the planar body 39 of each of the lower floor boards 636 of the floor system 612 is adjacent to and engaged with the upper floor section 30 of the floor system 612. Accordingly, the surface 40 of each of the lower floor boards 636 of the floor system 612 is welded to a bottom surface of the foot portion 46 of each of the ribs 42 of the upper floor boards 34. As shown in FIG. 9, therefore, the up/down orientation of the upper floor boards 34 and the lower floor boards 636 is the same. In other words, the generally U-shaped channels 43 of both the upper and lower floor boards 34, 636 are both oriented to face downwardly. Furthermore, the planar surface 40 of the planar body 39 of both the upper and lower floor boards 34, 636 is oriented to face upwardly.

Figure 10:
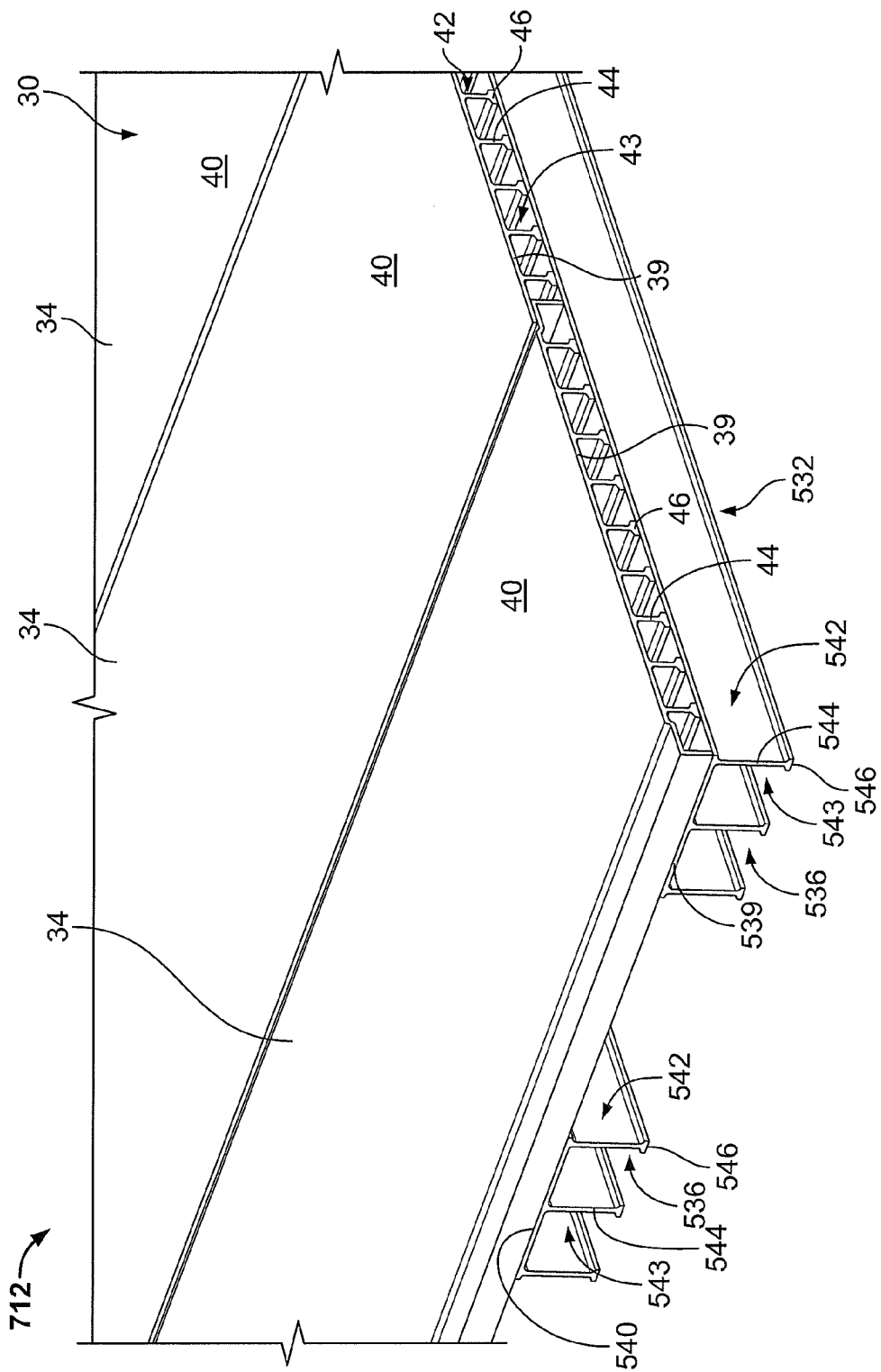
FIG. 10 is a perspective view is a perspective view of another glass fiber floor section similar to FIG. 9 showing the lower section floor boards in the reverse orientation.

Looking now to FIG. 10, still another floor system 712 is provided. Illustratively, the floor system 712 includes the upper floor system 30 shown in FIGS. 1-2B, 4, 8, and 9, as well as the lower floor boards 536 of the lower floor system 532 shown in FIG. 8. However, the lower floor boards 536 of the lower floor section 532 of the floor system 712 are is oriented downwardly similar to the lower floor boards 636 of the lower floor section 632 of the floor system 612 shown in FIG. 9. As such, the U-shaped channels 543 of the lower floor boards 634 are oriented to face downwardly, while the surface 40 of the planar body 39 of the lower floor boards 634 is oriented to face upwardly and is engaged with the upper floor boards 34.

Illustratively, the floor systems 12, 112, 212, 312, 412, 512, 612, 712 described herein each include upper and lower floor sections which are coupled to each other. Illustratively, each of the upper and lower floor sections described herein includes floor boards made from a polymer resin having glass fibers provided therein. Illustratively, the longitudinal axis of the upper floor boards and the longitudinal axis of the lower floor boards are oriented perpendicularly to each other. The upper floor boards provide a generally continuous upper floor surface of the storage container such that adjacent upper floor boards are engaged with and coupled to each other. The lower floor boards may provide a continuous lower floor section or may be spaced apart from each other at regular or random intervals. The lower floor boards may also be oriented upwardly such that a generally horizontal body of the lower floor boards is spaced-apart from the upper floor boards, or alternatively, the lower floor boards may be oriented downwardly in the same manner as the upper floor boards such that the generally horizontal body of the lower floor boards is adjacent to and engaged with the upper floor boards and the generally U-shaped channels of the lower floor boards are oriented to face downwardly. Illustratively, the upper floor boards and the lower floor boards within any particular floor system 12, 112, 212, 312, 412, 512, 612, 712 may be the same as or similar to each other and/or may have height and width dimensions different from each other.

As noted above, the upper and lower floor boards of the various floor systems 12, 112, 212, 312, 412, 512, 612, 712 described herein are made of a polymer resin having glass fibers distributed therein. The polymer resin may be a thermoplastic resin or a thermoset resin. Further, the glass fibers may be positioned in any particular orientation throughout the polymer resin. Illustratively, while each board includes glass fibers within the polymer resin, it should be understood that other suitable reinforcing fibers, such as carbon fibers, for example, may be used as well. As noted above, it should be understood that the upper and lower floor boards, or panels, disclosed in FIGS. 1-10 are not made from and do not include any wood or wood products. Rather, all floor boards disclosed herein are made of a glass fiber reinforced polymer and include glass fibers within a polymer resin. It should be understood, however, that the upper and lower floor boards disclosed herein may alternatively be made of any suitable material or combination of materials.

It should further be noted that none of the illustrative floor systems 12, 112, 212, 312, 412, 512, 612, 712 disclosed herein include any I-beam cross members typical of a floor system for a trailer or other such storage container. Rather, the floor systems 12, 112, 212, 312, 412, 512, 612, 712 disclosed herein each include only a plurality of generally identical upper and lower fiber reinforced polymer boards forming upper and lower floor sections. As such, the planar surface 40 of the lower boards 36 or 436 of the respective lower floor sections of the floor systems 12, 112, 212, 312, 412, 512 are configured to be open to the surrounding environment and generally provide the bottom-most structure of the respective floor system 12, 112, 212, 312, 412, 512 of the trailer 10. In other words, the floor systems 12, 112, 212, 312, 412, 512 do not include any other supporting members other than the upper and lower floor sections such that the bottom surface 40 of the planar body 39 of the lower floor section forms the bottom-most surface of the floor system 12; 112, 212, 312, 412, 512. Similarly, the floor systems 612, 712 do not include any other supporting members other than the respective upper and lower floor sections such that the bottom surface of the ribs 42 of the lower floor sections forms the bottom-most surface of the floor system 612, 712. As noted above, the upper and lower floor boards of each floor system 12, 112, 212, 312, 412, 512, 612, 712 disclosed herein may be coupled to each other using any suitable fasteners. Accordingly, the upper and lower floor boards may be coupled to each other via welds, adhesives, rivets, nails, screws, bolts, etc. In the case of welding (i.e., heat fusing), the adjacent surfaces of the upper and lower floor boards are welded, or fused, to each other such that a chemical bond between the polymer resin of the adjacent upper and lower boards is formed.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A floor system configured for use with a storage container transported by a vehicle, the floor system comprising:
   an upper floor section including a plurality of upper floor boards made of glass fiber reinforced polymer; and
   a lower floor section including a plurality of lower floor boards made of glass fiber reinforced polymer,
      wherein a cross-sectional shape of each of the plurality of upper and lower floor boards defines a plurality of generally U-shaped channels.

2. The floor system of claim 1, wherein each of the plurality of upper and lower floor boards includes a planar body and a plurality of ribs extending perpendicularly outwardly from an inner surface of the planar body.

3. The floor system of claim 2, wherein each rib includes a body section having a first end coupled to the inner surface of the planar body and a foot section coupled to a second end of the body section.

4. The floor system of claim 2, wherein the inner surface of the planar body of each of the plurality of upper floor boards faces the inner surface of the planar body of each of the plurality of lower floor boards.

5. The floor system of claim 1, wherein a longitudinal axis of each of the plurality of upper floor boards is perpendicular to a longitudinal axis of each of the plurality of lower floor boards.

6. The floor system of claim 5, wherein the longitudinal axis of each of the plurality of upper floor boards is configured to be parallel to a longitudinal axis of the storage container.

7. The floor system of claim 1, wherein the plurality of upper floor boards cooperate with each other to define a generally continuous upper floor surface, and wherein the plurality of lower floor boards are spaced-apart from each other.

8. The floor system of claim 1, further comprising an attachment plate coupled to at least one of the upper floor section and the lower floor section and configured to be coupled to a sidewall of the trailer.

9. The floor system of claim 1, wherein a width of each of the plurality of upper floor boards is greater than a width of each of the plurality of lower floor boards.

10. The floor system of claim 1, wherein a height of each of the plurality of upper floor boards is less than a height of each of the plurality of lower floor boards.

11. The floor system of claim 1, wherein the cross-sectional shape of each of the plurality of upper floor boards defines more U-shaped channels than the cross-sectional shape of each of the plurality of lower floor boards.

12. The floor system of claim 1, wherein the upper floor section is heat-welded to the lower floor section.

13. The floor system of claim 1, wherein the floor system is void of laterally-extending metal cross members.

14. A floor system configured for use with a storage container transported by a vehicle, the floor system comprising:
   an upper floor section made of a fiber reinforced polymer; and
   a lower floor section made of a fiber reinforced polymer,
      wherein the upper floor section is heat-welded to the lower floor section,
      wherein substantially all of a bottom surface of the lower floor section is configured to be exposed to and in direct communication with a surrounding environment located outside and below the storage container, and
      wherein the upper floor section includes a plurality of upper floor boards coupled to each other and the lower floor section includes a plurality of lower floor boards coupled to the plurality of upper floor boards.

15. The floor system of claim 14, wherein the fiber reinforced polymer includes glass fibers.

16. The floor system of claim 14, wherein a cross-sectional shape of each of the upper and lower floor boards defines a plurality of generally U-shaped channels, and wherein the U-shaped channels of the upper and lower floor boards face each other such that the U-shaped channels of the upper floor board face downwardly and the U-shaped channels of the lower floor boards face upwardly.

* * * * *